United States Patent
Abrol et al.

(10) Patent No.: US 7,079,511 B2
(45) Date of Patent: Jul. 18, 2006

(54) METHOD AND APPARATUS FOR HANDOFF OF A WIRELESS PACKET DATA SERVICES CONNECTION

(75) Inventors: Nischal Abrol, San Diego, CA (US); Ramin Rezaiifar, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 927 days.

(21) Appl. No.: 09/732,328

(22) Filed: Dec. 6, 2000

(65) Prior Publication Data

US 2002/0068570 A1 Jun. 6, 2002

(51) Int. Cl.
  *H04Q 7/20* (2006.01)
  *H04Q 7/24* (2006.01)
  *H04L 12/28* (2006.01)
  *H04L 12/56* (2006.01)

(52) U.S. Cl. .................. 370/331; 370/338; 370/349; 455/435.1; 455/437

(58) Field of Classification Search ............... 370/328, 370/329, 331, 338, 349, 352; 455/422.1, 455/432.1, 435.1, 436, 437, 440, 442, 456.1
See application file for complete search history.

(56) References Cited

U.S. PATENT DOCUMENTS

| | | | | |
|---|---|---|---|---|
| 4,775,999 A | * | 10/1988 | Williams | 455/435.1 |
| 5,657,375 A | * | 8/1997 | Connolly et al. | 455/436 |
| 5,907,542 A | * | 5/1999 | Kuehnel et al. | 370/331 |
| 6,137,791 A | * | 10/2000 | Frid et al. | 370/352 |
| 6,163,704 A | * | 12/2000 | Joong et al. | 455/466 |
| 6,404,754 B1 | * | 6/2002 | Lim | 370/338 |
| 6,510,153 B1 | * | 1/2003 | Inoue et al. | 370/354 |
| 6,515,974 B1 | * | 2/2003 | Inoue et al. | 370/331 |
| 6,542,716 B1 | * | 4/2003 | Dent et al. | 455/13.1 |
| 6,567,664 B1 | * | 5/2003 | Bergenwall et al. | 455/403 |
| 6,665,537 B1 | * | 12/2003 | Lioy | 455/435.1 |
| 6,708,031 B1 | * | 3/2004 | Purnadi et al. | 455/436 |

(Continued)

FOREIGN PATENT DOCUMENTS

WO 0051374 8/2000

(Continued)

OTHER PUBLICATIONS

Valko, Andras "Cellular IP: A New Approach to Internet Host Mobility" Computer Communication Review 29(1): 50-65 (1999),

*Primary Examiner*—Alpus H. Hsu
(74) *Attorney, Agent, or Firm*—Philip R. Wadsworth; Thien T. Nguyen; Roberta A. Young

(57) ABSTRACT

A novel method and apparatus is disclosed for performing seamless handoff of a mobile station (MS) between Radio Access Networks (RANs) that use different types of wireless interfaces. The described embodiments enable an MS to handoff between different RANs without causing routing ambiguity, and without substantial loss of network data. Upon moving from the coverage area of a first RAN using a first wireless interface to the coverage area of a second RAN using a second wireless interface, an MS determines whether routing ambiguity may result from the change of RAN and, based on the determination, triggers a re-registration of its network address. A foreign agent (FA) within a packet data serving node (PDSN) monitors network address re-registrations in order to determine whether multiple RAN-PDSN (R-P) connections are being created for the same MS. Based on this determination, the PDSN terminates redundant R-P network connections resulting from movement of the MS between different RANs.

11 Claims, 9 Drawing Sheets

U.S. PATENT DOCUMENTS

| | | | |
|---|---|---|---|
| 6,735,202 B1 * | 5/2004 | Ahmed et al. | 370/392 |
| 6,745,032 B1 * | 6/2004 | Alvesalo et al. | 455/436 |
| 6,771,623 B1 * | 8/2004 | Ton | 370/331 |
| 2001/0036834 A1 * | 11/2001 | Das et al. | 455/458 |
| 2002/0021681 A1 * | 2/2002 | Madour | 370/331 |
| 2002/0067692 A1 * | 6/2002 | Yun et al. | 370/209 |
| 2002/0067707 A1 * | 6/2002 | Morales et al. | 370/331 |

FOREIGN PATENT DOCUMENTS

| | | |
|---|---|---|
| WO | 0067499 | 11/2000 |

* cited by examiner

METHOD AND APPARATUS FOR HANDOFF OF A WIRELESS PACKET DATA SERVICES CONNECTION

BACKGROUND

I. Field

The present invention relates to wireless communications. More particularly, the present invention relates to a novel method and apparatus for performing seamless handoff of a mobile station between radio access networks having different wireless interfaces during wireless packet data service operation.

II. Background

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communication systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", and referred to herein as IS-95. In addition, a new standard for CDMA communication systems has been proposed in the United States in Telecommunications Industry Association (TIA), entitled "Upper Layer (Layer 3) Signaling Standard for cdma2000 Spread Spectrum Systems, Release A—Addendum 1", dated Oct. 27, 2000, and referred to herein as "1×." An additional standard for providing high speed data services has been proposed in the TIA, entitled "cdma2000 High Rate Packet Data Air Interface Specification," dated Oct. 27, 2000, and referred to herein as "HDR."

The International Telecommunications Union recently requested the submission of proposed methods for providing high rate data and high-quality speech services over wireless communication channels. A first of these proposals was issued by the Telecommunications Industry Association, entitled "The IS-2000 ITU-R RTT Candidate Submission." A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as "W-CDMA." A third proposal was submitted by U.S. TG 8/1 entitled "The UWC-136 Candidate Submission", hereinafter referred to as "EDGE." The contents of these submissions is public record and is well known in the art.

IS-95 was originally optimized for transmission of variable-rate voice frames. Subsequent standards have built on the standard to support a variety of additional non-voice services including packet data services. One such set of packet data services was standardized in the United States in Telecommunications Industry Association TIA/EIA/IS-707-A, entitled "Data Service Options for Spread Spectrum Systems", incorporated by reference herein, and hereafter referred to as "IS-707."

IS-707 describes techniques used to provide support for sending Internet Protocol (IP) packets through an IS-95 wireless network. Packets are encapsulated into a featureless byte stream using a protocol called Point-to-Point Protocol (PPP). Using PPP, IP datagrams having lengths of up to 1500 bytes can be transported over a wireless network in segments of arbitrary size. The wireless network maintains PPP state information for the duration of the PPP session, or as long additional bytes may be sent in the continuous byte stream between the PPP end points.

A remote network node such as a personal or laptop computer (PC) connected to a packet-data-capable wireless mobile station (MS) may access the Internet through a wireless network in accordance with the IS-707 standard. Alternatively, the remote network node such as a web browser may be built-in to the MS, making the PC optional. An MS may be any of a number of types of devices including, but not limited to PC card, personal data assistant (PDA), external or internal modem, or wireless phone or terminal. The MS sends data through the wireless network, where it is processed by a packet data serving node (PDSN). The PPP state for a connection between an MS and the wireless network is typically maintained within the PDSN. The PDSN is connected to an IP network such as the Internet, and transports data between the wireless network and other entities and agents connected to the IP network. In this way, the MS can send and receive data to another entity on the IP network through the wireless data connection. The target entity on the IP network is also called a correspondent node.

The MS must obtain an IP address before sending and receiving IP packets over the IP network. In some early implementations, the MS was assigned an IP address from a pool of addresses belonging exclusively to the PDSN. Each PDSN was connected to one or more Radio Access Networks (RANs) associated with a limited geographical area. When the MS moved out of the area served by the first PDSN, data addressed to the MS through the first PDSN could not reach the MS. If the MS moved into an area served by a second PDSN, the MS would have to be assigned a new IP address from the address space of the second PDSN. Any ongoing connection with a correspondent node that was based on the old IP address would be abruptly terminated.

In order to prevent connections from being lost when moving from PDSN to PDSN, MSs use a protocol known as mobile IP. The Internet Engineering Task Force (IETF) has standardized mobile IP in request for comments (RFC) 2002, entitled "IP Mobility Support," published in October 1996, and well known in the art. The use of mobile IP in cdma2000 networks has been standardized in EIA/TIA/IS-835, entitled "Wireless IP Network Standard," dated June, 2000, and referred to herein as "IS-835." In mobile IP, the PDSN does not provide an IP address from its own pool of addresses. Instead, the PDSN acts as a foreign agent (FA) that facilitates assignment of an address from a home agent (HA) located somewhere in the IP network. The MS communicates through the FA to the HA, and receives an IP address assigned from an address pool belonging to the HA. When the MS moves from a first PDSN to a second PDSN, the MS communicates through the second PDSN and FA in order to re-register its existing IP address with the HA.

IS-707 and IS-835 describe a dormant mode, in which a wireless link that was established for transporting packet data, but which is idle for a certain period of time, may be reclaimed by the network without terminating the associated PPP session. When the flow of packet data resumes, the wireless link is re-established without having to repeat PPP configuration and negotiation. Preserving the PPP state when the wireless link has been terminated thus enables the MS and the wireless network to resume sending packet data more quickly than if the PPP state had to be re-established.

The proposed 1× standard provides mechanisms to update routing between an HA and multiple PDSNs and 1× RANs. The proposed HDR standards provide mechanisms to update routing between an HA and multiple PDSNs and HDR RANs. Both the HDR and 1× standards can effectively update packet routing even when an MS changes RANs while in dormant mode, as long as the MS does not move to a RAN using a different type of wireless interface. For example, if an MS moves from a 1× RAN to an HDR RAN while dormant, routing ambiguities or redundancies can occur, and packets can be lost. As these various systems are deployed, there will be a need for mechanisms to effectively update routing of packets to an MS moving between RANs using different types of wireless interfaces.

SUMMARY

Embodiments of the present invention are directed to enabling seamless handoff of a mobile station (MS) between Radio Access Networks (RANs) that use different types of wireless interfaces. The embodiments described herein enable an MS to handoff between different RANs without causing routing ambiguity, and without substantial loss of network data. Upon moving from the coverage area of a first RAN using a first wireless interface to the coverage area of a second RAN using a second wireless interface, an MS determines whether routing ambiguity may result from the change of RAN and, based on the determination, triggers a re-registration of its network address. A foreign agent (FA) within a packet data serving node (PDSN) monitors network address re-registrations in order to determine whether multiple RAN-PDSN (R-P) connections are being created for the same MS. Based on this determination, the PDSN terminates redundant R-P network connections resulting from movement of the MS between different RANs.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

The word "exemplary" is used in this application to mean "serving as an example, instance, or illustration." Any embodiment described as an "exemplary embodiment" is not to be construed as necessarily preferred or advantageous over other embodiments described herein.

Figure 1:
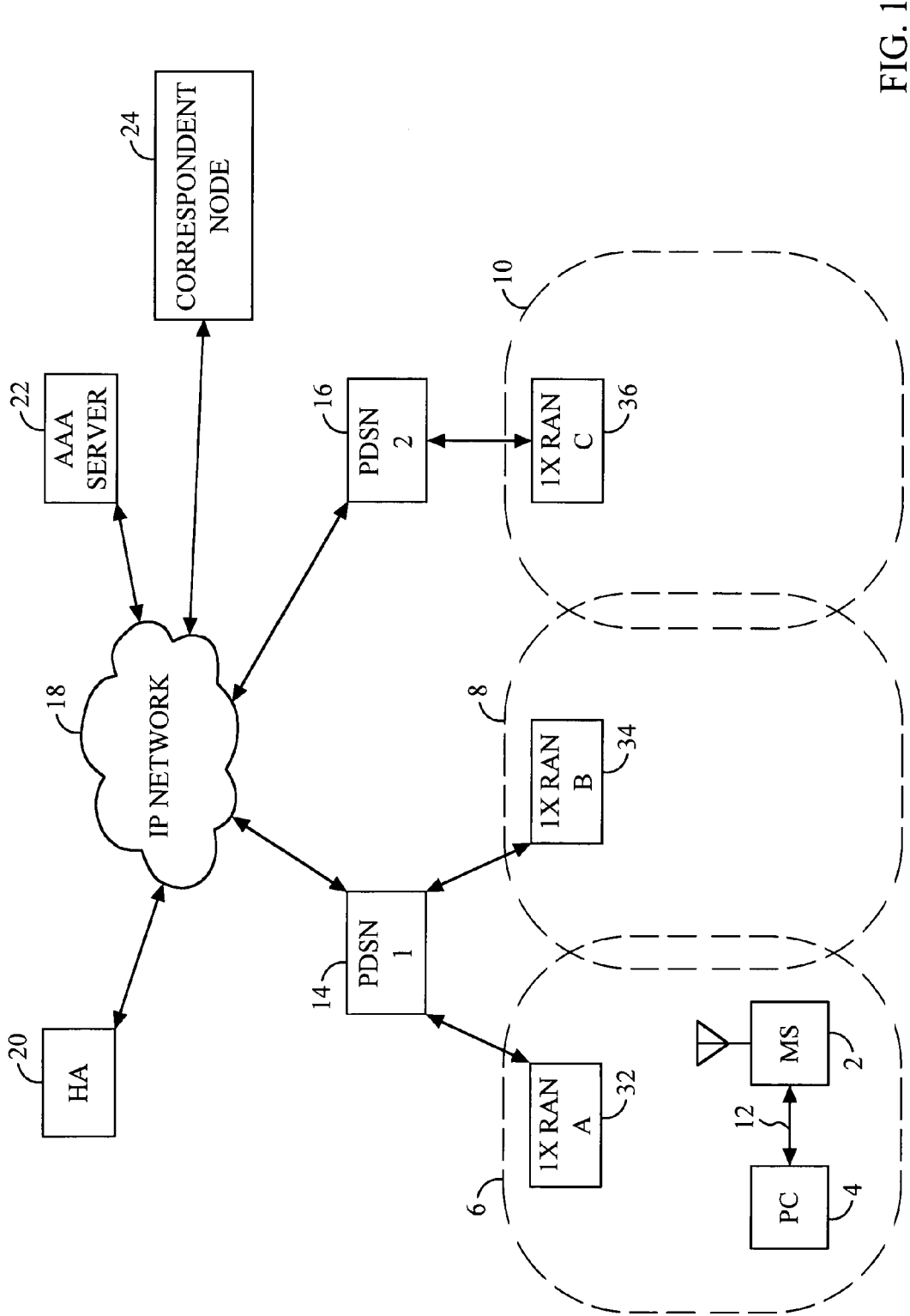
FIG. 1 is a diagram of a wireless system configuration using only 1× radio access networks (RANs)

FIG. 1 depicts a network configuration in a system using only 1× radio access networks (RANs) 32, 34, 36. In an exemplary embodiment, a personal or laptop computer (PC) 4 is connected to a wireless mobile station (MS) 2 through a data connection 12. The data connection 12 between the PC and the MS 2 may use a physical cable such as an ethernet, serial, or universal serial bus (USB) cable. Alternatively, the data connection 12 may be a wireless connection such as an infrared or other optical connection or a ratio connection such as Bluetooth or IEEE 802.11. As previously discussed, the PC may alternatively be incorporated into the MS 2 to enable network access through a single device. In the figure, the MS 2 changes its physical location among coverage areas 6, 8, 10 associated with $RAN_A$ 32, $RAN_B$ 34, and $RAN_C$ 36 respectively. $RAN_A$ 32 and $RAN_B$ 34 are connected to $PDSN_1$ 14, which in turn is connected to an IP Network 18. $RAN_C$ 36 is connected to $PDSN_2$ 16, which is then connected to the IP Network 18. Also accessible through the IP Network 18 are a home agent (HA) 20, an authentication, authorization and accounting (AAA) Server 22, and a correspondent node 24. Multiple additional PDSNs, HAs, AAA Servers, and correspondent nodes may be connected to the IP Network 18 but are omitted for simplicity.

When the MS 2 initially connects to a RAN, for example $RAN_A$ 32, the MS 2 must obtain an IP address from some entity that is connected with the IP network 18. As discussed above, in early implementations the MS 2 was assigned an IP address from a pool of addresses allocated to the PDSN 14. Because all packets bearing an IP address from that pool of addresses would be routed to the PDSN 14 by the IP network 18, the PDSN 14 could then route those packets to the corresponding MS 2. However, if the MS 2 moved out of the coverage of any RAN connected to the PDSN 14, the PDSN 14 would no longer be able to forward packets to the MS 2. For example, if the MS 2 moved from the coverage area 6 of $RAN_A$ 32 to the coverage area 10 of $RAN_C$ 36, the MS 2 would have to obtain a new IP address from the address pool of $PDSN_2$ 16. Any packets sent to the old address associated with $PDSN_1$ 14 would have to be discarded, and any ongoing network connections using the old address could no longer be used.

In more recent mobile IP implementations, the MS 2 instead obtains its IP address from an HA 20 connected to the IP network. After obtaining an address from the pool associated with HA 20, mobile IP protocol enables the MS 2 to receive packets bearing that IP address through any of multiple RANs, 32, 34, or 36, or through any of multiple PDSNs 14 or 16. As an alternative to dynamic allocation of an IP address from the HA 20, the MS 2 may also have an IP address within the address pool of HA 20 provisioned in the memory of the MS 2 ahead of time, for example upon activation of services.

Figure 2:
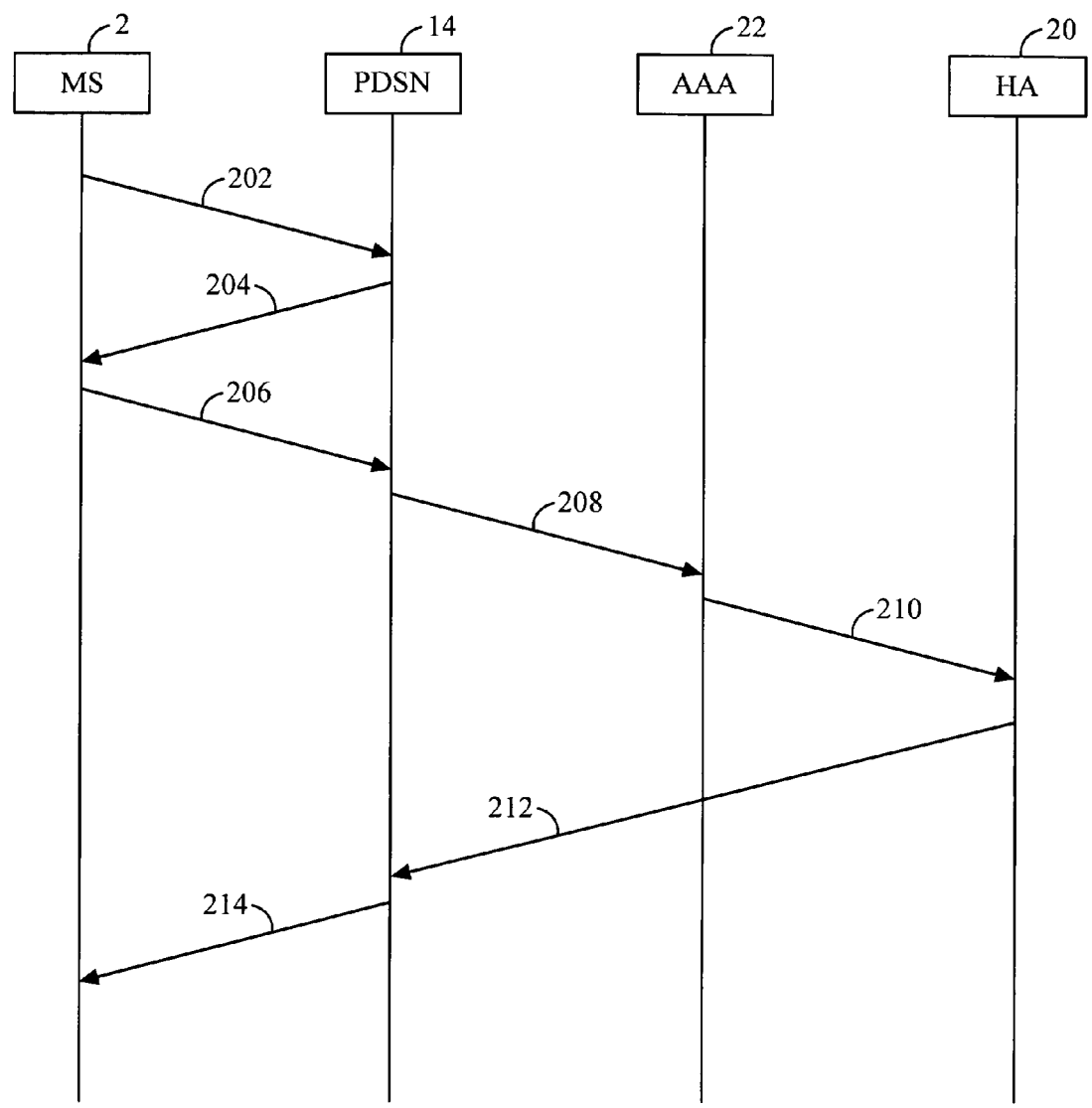
FIG. 2 is an exemplary message flow diagram depicting assignment of an IP address to an MS 2 in accordance with the mobile IP standard.

FIG. 2 is an exemplary message flow diagram depicting assignment of an IP address to an MS 2 in accordance with the mobile IP standard. First, the MS 2 originates a wireless link to a RAN connected to PDSN 14 and sends a first message 202 through a RAN to the PDSN 14. If the MS 2 has an international mobile station identity (IMSI), the MS 2 sends the IMSI in the first message 202. The first message 202 may be one of several different types, depending on the type of wireless interface supported by the RAN or the connection state of the wireless link between the MS 2 and the RAN. For example, the first message 202 may be an origination message if the MS 2 is not connected to the RAN, or may be an agent solicitation message if the MS 2 is already communicating over a wireless link with the RAN. Though the numbering in the example shown indicates $PDSN_1$ 14, the first message 202 could also be sent through a RAN connected to another PDSN such as $PDSN_2$ 16.

In response to the first message 202, the PDSN 14 responds with a message 204 containing an agent advertisement and an authentication challenge. The agent advertisement identifies the address of the foreign agent (FA) within the PDSN 14. The authentication challenge is part of a handshake that prevents other network entities from accidentally or maliciously using the network identity to intercept data packets intended for the MS 2. The MS 2 and the authentication, authorization, and accounting (AAA) server 22 are programmed with shared secret information not available throughout the IP network 18. The shared secret information allows the AAA server 22 to verify the identity of the MS 2 before the MS 2 is allowed to send requests to the HA 20. If authentication with the AAA server 22 fails, then the MS 2 cannot request an IP address from the HA 20. In an exemplary embodiment, the shared secret takes the form of a user name and a password.

Upon receiving the challenge in the message 204 received from the PDSN 14, the MS 2 uses its shared secret information in combination with the challenge information to form a challenge response that will enable the HA 20 to verify the identity of the MS 2. For example, the MS 2 uses a one-way hashing function to combine the shared secret information with the challenge information. The MS 2 sends a message 206 back to the PDSN 14 containing the challenge information, the challenge response, and a registration request. The PDSN 14 then forwards the three pieces of information to the AAA server 22 in a message 208. Using the same one-way hashing function, the AAA server 22 can verify the shared secret information used by the MS 2, even though the shared secret information itself is never sent through the network. The AAA server 22 can be one of several brands or types. In an exemplary embodiment, a Remote Authentication Dial In User Service (RADIUS) server is used.

If the AAA server 22 determines that the challenge response from the MS 2 is valid, the AAA server 22 forwards the registration request 210 to the HA 20. The HA 20 has a pool of available IP addresses that it assigns to mobile network entities such as the MS 2. Any IP packet sent through the IP network 18 bearing a destination address from the HA's 20 pool of addresses are routed by the IP network 18 to the HA 20. Based on the contents of the registration request 210, the HA 20 forms a registration reply 212 containing an IP address to be used as a source address in packets sent by the MS 2 to other network entities. The HA 20 sends the response 212 to the FA in the PDSN 14. The FA records the IP address and associates it with and establishes a RAN-PDSN (R-P) session. In an exemplary embodiment, the FA stores the R-P information in a table that is indexed according to IP address. To complete the assignment of the IP address to the MS 2, the PDSN sends a message 214 to the MS 2 through the RAN. The message 214 contains the registration reply from the HA 20 and includes the IP address allocated to the MS 2.

After its IP address has been registered, the MS 2 may begin sending IP packets throughout the IP network 18. For example, the MS 2 may begin communicating with a correspondent node 24, such as a web server. Packets sent by the MS 2 bear the destination address of the correspondent node 24 and the source address assigned to the MS 2. All messages sent by the MS 2 are routed through the FA in the PDSN 14. The FA may send an outgoing packet straight into the IP network 18 or may encapsulate it in a larger packet addressed to the HA 20. If the latter approach is taken, the HA 20 decapsulates the packet received from the PDSN 14 and forwards the decapsulated packet to its destination within the correspondent node 24.

Responses from the correspondent node 24 will bear the destination address assigned to the MS 2 from the address pool belonging to the HA 20. All such messages are routed by the IP network 18 to the HA 20. The HA 20 inspects the destination address of each received IP packet to identify the MS 2 and the associated PDSN 14. Then, the HA 20 encapsulates the packet in a larger packet bearing the destination address of the PDSN 14. The encapsulated packet is received by the FA in the PDSN 14. The FA decapsulates the packet and finds the destination IP address of the decapsulated packet in its R-P table. The FA then forwards the packet through the RAN associated with the corresponding R-P session. To the MS 2, the mobile IP process is transparent except for a bit of added delay for all the encapsulation, decapsulation, and forwarding.

In FIG. 1, the MS 2 is shown as being located in the coverage area 6 of $RAN_A$ 32. In FIG. 1, all the RANs 32, 34, 36 use a 1× type of wireless interface. Networks using a 1× wireless interface use IMSIs to identify mobile stations. An MS 2 establishing a new wireless link sends its IMSI in the origination message. The RAN authenticates the IMSI by exchanging challenge and challenge response messages with a home location register (HLR) (not shown). The HLR is part of a signaling system 7 (SS7) wireless phone network that is standardized and well known in the art. Authentication of IMSIs is accomplished using techniques similar to the one-way hash function techniques described above in association with mobile IP authentication.

In an exemplary embodiment as shown in FIG. 1, the MS 2 first establishes a connection through a first 1× $RAN_A$ 32 and registers with the HA 20 as described above in association with FIG. 2. After mobile IP registration is complete, the MS 2 uses an address from the address pool of the HA 20, and sends packets using a PPP state within the FA in $PDSN_1$ 14. In a 1× system, $PDSN_1$ 14 identifies the MS 2 by its IMSI. Within the coverage area 6 of $RAN_A$ 32, the MS 2 monitors overhead messages broadcast from base stations in $RAN_A$ 32. Among other types if information, those overhead messages identify the packet zone ID (PZID) of $RAN_A$ 32.

When the MS 2 leaves the coverage area 6 of $RAN_A$ 32 and enters the coverage area 8 of $RAN_B$ 34, the MS 2 decodes the overhead messages broadcast by the base stations in $RAN_b$ 34. The $RAN_B$ overhead messages contain a different PZID than that broadcast by base stations in $RAN_A$. When the MS 2 detects the change in the PZID, it sends a "fake origination" to $RAN_B$ 34. In an exemplary embodiment, the origination message contains the IMSI of the MS 2, a data ready to send (DRS) field, and a PREV_PZID field.

Because the origination is primarily for route updating purposes, the DRS field is set to 0, indicating that the MS 2 does not have packet data to send. If the MS 2 happens to have new packet data to be sent to the network, it may originate a regular call using an origination having a 1 in the DRS field. The PREV_PZID field contains the PZID of the previous system to which the MS 2 was connected. $RAN_B$ 34 receives the origination and forwards the IMSI and the PREV_PZID of the MS 2 to its serving PDSN, $PDSN_1$ 14. $PDSN_1$ 14 determines from the IMSI that the MS 2 has an existing PPP state within the $PDSN_1$ 14, and determines from the PREV_PZID value that the MS 2 came from $RAN_A$ 32. Because the $PDSN_1$ is connected to both the original $RAN_A$ 32 and the destination $RAN_B$ 34, the $PDSN_1$ can generally just redirect the same PPP state to the destination $RAN_B$ 34. If, for some reason, $PDSN_1$ 14 cannot redirect the same PPP state to the destination $RAN_B$ 34, $PDSN_1$ 14 resets its PPP state and forces the MS 2 to establish a new PPP session.

When the MS 2 leaves the coverage area 8 of $RAN_B$ 34 and enters the coverage area 10 of $RAN_C$ 36, the MS 2 decodes the overhead messages broadcast by the base stations in $RAN_C$ 36. The $RAN_C$ 36 overhead messages contain a different PZID than broadcast by base stations in $RAN_B$ 34. When the MS 2 detects the change in the PZID, it sends a "fake origination" to $RAN_C$ 36 containing the IMSI of the MS 2, a DRS field having a value of 0, and a PREV_PZID field identifying the PZID of the previous RAN, $RAN_B$ 34. $RAN_C$ 36 receives the origination and forwards the IMSI and the PREV_PZID of the MS 2 to its serving PDSN, $PDSN_2$ 16. Depending on whether the MS 2 had previously been connected to $PDSN_2$ 16, $PDSN_2$ 16 may have a PPP state associated with the IMSI of the MS 2. Regardless of the existence of a previous PPP state, $PDSN_2$ 16 determines from the PREV_PZID value that the MS 2 came from a RAN connected to a different PDSN. $PDSN_2$ 16 cannot retrieve a PPP state from a different PDSN, and is consequently required to establish a new PPP session with the MS 2. If $PDSN_2$ 16 had a previous PPP session set up with the MS 2, this means that $PDSN_2$ 16 must discard that PPP session.

After a new PPP session is established between the MS 2 and $PDSN_2$ 16, $PDSN_2$ 16 sends an agent advertisement message to the MS 2 identifying the address of the FA within $PDSN_2$ 16. Because the address of each FA is different, the FA address of $PDSN_2$ 16 will be different than the FA address of $PDSN_1$ 14. When the MS 2 receives an agent advertisement having a different address, the MS determines that it must re-register its IP address with the HA 20. The MS 2 re-registers its IP address with the HA 20, for example according to the protocol described in association with FIG. 2. Using mobile IP authentication as described above, the HA 20 recognizes that the MS 2 has moved and is requesting the same IP address. If possible, the HA 20 allocates the same IP address to the MS 2 and redirects messages destined for that address to $PDSN_2$ 16. Generally, the HA 20 does not send notification of the redirection to the original PDSN, $PDSN_1$ 14.

Figure 3:
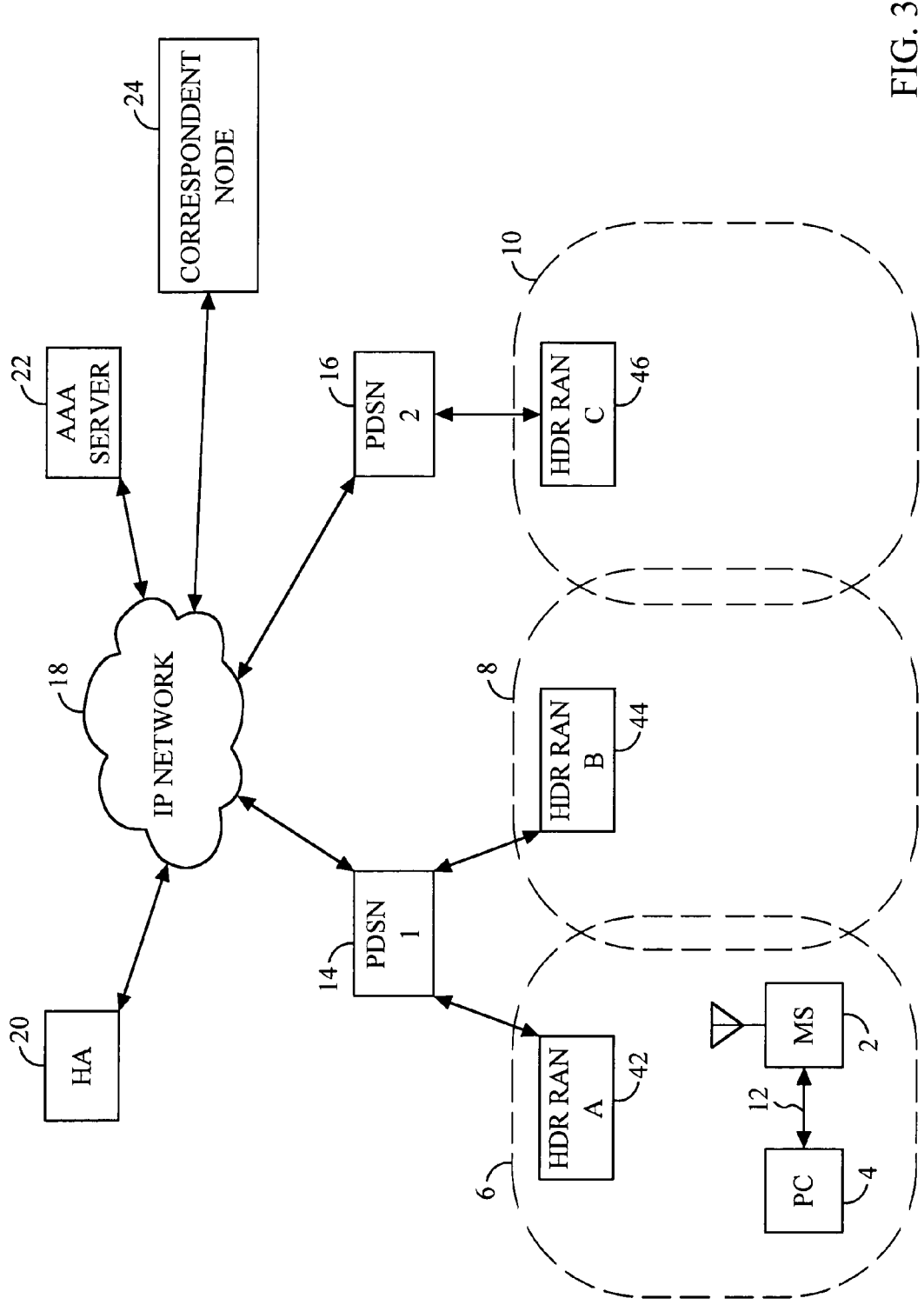
FIG. 3 is a diagram of a wireless system configuration using only HDR radio access networks (RANs)

FIG. 3 depicts a network configuration in a system using only HDR RANs 42, 44, 46. The MS 2 is initially located in the coverage area 6 of $RAN_A$ 42. In FIG. 3, all the RANs 42, 44, 46 use an HDR type of wireless interface. Networks using an HDR wireless interface use Unicast Access Terminal Identifiers (UATIs) to identify mobile stations.

An HDR RAN generally does not obtain an IMSI from an MS 2, but assigns an IMSI to each MS 2 primarily to allow identification of R-P sessions with a PDSN. By providing some IMSI support, an HDR network can use the same kind of PDSN used by 1× systems. In general, a strictly HDR network does not perform any IMSI authentication, and is not connected to an SS7 wireless phone network. In an exemplary embodiment, a database of UATIs, IMSIs, and other information is distributed among HDR RANs in a wireless network.

The MS 2 connects to an HDR system through a first HDR RAN, for example $RAN_A$ 42, and obtains a UATI from $RAN_A$ 42. $RAN_A$ 42 then assigns a temporary IMSI to the MS 2 in order to enable packet data to be routed by the FA in $PDSN_1$ 14. Alternatively, if $RAN_A$ 42 is capable of authenticating the IMSI, $RAN_A$ 42 assigns the actual IMSI to the MS 2 in establishing the R-P link with $PDSN_1$ 14. If $RAN_A$ 42 is capable of authenticating the IMSI, it may do so using an Authentication Center on an SS7 network or using the AAA server 22. The MS 2 then registers with the HA 20 as described above in association with FIG. 2. After mobile IP registration is complete, the MS 2 uses the IP address assigned to it by the HA 20, and sends packets using a PPP state within the FA in $PDSN_1$ 14. Within the coverage area 6 of $RAN_A$ 42, the MS 2 monitors overhead messages broadcast from base stations in $RAN_A$ 42. In an exemplary embodiment, the overhead messages include information that enables the MS 2 to determine when it is located within the coverage area 6 associated with base stations of $RAN_A$ 42. The overhead messages that allow the MS 2 to identify the RAN associated with a coverage area are referred to as a subnet mask. When the MS 2 leaves one coverage area and enters another, the subnet mask received on the overhead channels will change accordingly.

When the MS 2 leaves the coverage area 6 of $RAN_A$ 42 and enters the coverage area 8 of $RAN_B$ 44, the MS 2 decodes the overhead messages broadcast by the base stations in $RAN_B$ 44. When the MS 2 detects the change in the subnet mask, it sends a UATI Update message to $RAN_B$ 44. The UATI Update message contains the UATI assigned to the MS 2 by $RAN_A$ 42. $RAN_B$ 44 determines that the UATI was assigned by some other RAN, and queries other HDR RANs connected to the same network for the UATI. As described above, a database of UATIs, PPP state information, IMSIs, and other information is distributed among HDR RANs in a wireless network. Based on the previously assigned UATI, $RAN_B$ 44 obtains the table information associated with the MS 2. Because both $RAN_A$ 42 and $RAN_B$ 44 are connected to $PDSN_1$ 14, $RAN_B$ 44 determines the temporary IMSI associated with the MS's 2 UATI and notifies $PDSN_1$ 14 that the MS 2 associated with that IMSI has moved to $RAN_B$ 44.

When the MS 2 leaves the coverage area 8 of $RAN_B$ 44 and enters the coverage area 10 of $RAN_C$ 46, the MS 2 decodes the overhead messages broadcast by the base stations in $RAN_C$ 46. The $RAN_C$ 46 overhead messages contain a different subnet mask than broadcast by base stations in $RAN_B$ 44. When the MS 2 detects the change in the subnet mask, it sends a UATI Update message to $RAN_C$ 46 containing the MS's 2 previously assigned UATI. $RAN_C$ 46 receives the UATI Update message and queries other RANs connected to $PDSN_2$ 16 to determine whether the MS 2 received its UATI assignment from a nearby RAN. Because the MS 2 received its UATI assignment in $RAN_B$ 44, which is connected to $PDSN_1$ 14, $RAN_C$ 46 will be unable to redirect the PPP state to itself. $RAN_C$ 46 therefore assigns a new UATI to the MS 2 and forces the MS 2 to establish a new PPP session. The MS 2 will consequently lose state information associated with its previous $PDSN_1$ 14 PPP session.

After a new PPP session is established between the MS 2 and PDSN$_2$ 16, PDSN$_2$ 16 sends an agent advertisement message to the MS 2 identifying the address of the FA within PDSN$_2$ 16. Because the address of each FA is different, the FA address of PDSN$_2$ 16 will be different than the FA address of PDSN$_1$ 14. When the MS 2 receives an agent advertisement having a different address, the MS determines that it must re-register its IP address with the HA 20. The MS 2 re-registers its IP address with the HA 20, for example according to the protocol described in association with FIG. 2. Using mobile IP authentication as described above, the HA 20 recognizes that the MS 2 has moved and is requesting the same IP address. If possible, the HA 20 allocates the same IP address to the MS 2 and then redirects messages destined for that address to PDSN$_2$ 16. Generally, the HA 20 does not send notification of the redirection to the original PDSN, PDSN$_1$ 14.

Figure 4:
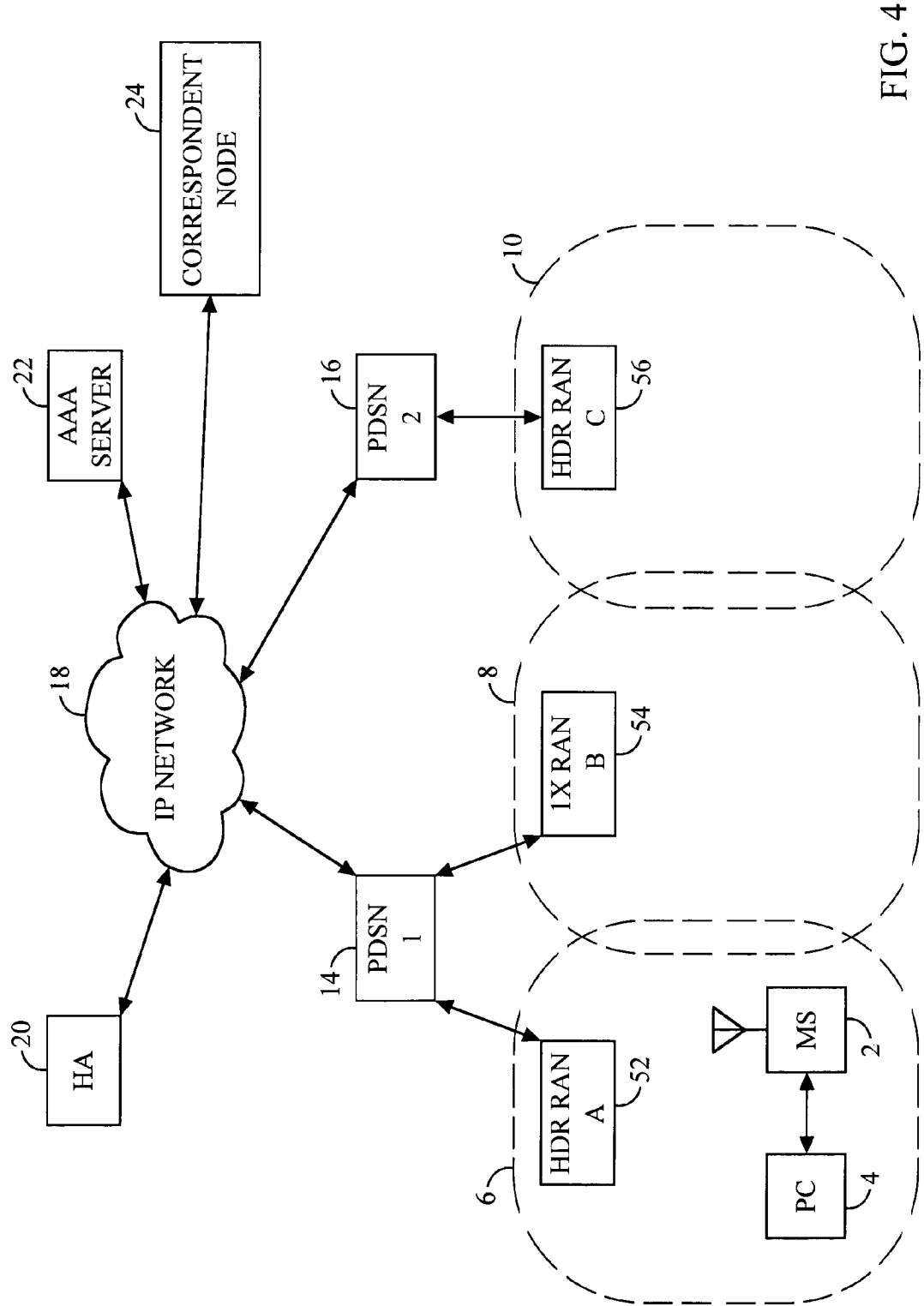
FIG. 4 is a block diagram of a subscriber station apparatus configured in accordance with an embodiment of the present invention.

FIG. 4 depicts a network configuration in a system using a mixture of HDR RANs 52, 56 and 1× RANs 54. The MS 2 is initially located in the coverage area 6 of RAN$_A$ 52. An MS 2 designed to operate in a mixed HDR and 1× system has attributes of both systems. For example, it has an IMSI stored in memory, but is also programmed to connect to an HDR network using a UATI.

If HDR RANs 52, 56 are capable of performing authentication of IMSIs, then R-P links with PDSNs 14 and 16 can be established using the actual IMSI of the MS 2. IMSI authentication may be accomplished by an HDR RAN using an Authentication Center on an SS7 network or using the AAA server 22. In an exemplary embodiment, the MS 2 sends its IMSI to an HDR RAN at the beginning of HDR session negotiations. Each HDR RAN 52, 56 can then use the true IMSI of the MS 2 to establish its R-P links with PDSNs 14 and 16. Because the same IMSI is used for both the 1× RAN 54 and the HDR RANs 52, 56, the PDSN can easily resolve any routing ambiguity and avoid mis-routing any packets addressed to the MS 2. Furthermore, if the previous 1× RAN and the destination HDR RAN share a single PDSN, for example in a configuration similar to that of RAN$_A$ 52, RAN$_B$ 54, and PDSN$_1$ 14, the PDSN can re-route its R-P connection to the destination RAN and re-use the existing PPP state.

However, if HDR RANs 52 and 56 are not capable of authenticating IMSIs, they will create temporary IMSIs for use in R-P links with PDSNs 14 and 16. A subsequent handoff from a 1× RAN to an HDR RAN, for example from RAN$_B$ 54 to RAN$_A$ 52, can cause routing problems in a shared PDSN such as PDSN$_1$ 14. In an exemplary embodiment, routing problems caused by the creation of multiple R-P sessions having the same IP address but different IMSIs are addressed with minor modifications to PDSN operation.

In an exemplary embodiment, the MS 2 connects to an HDR system RAN$_A$ 52, and obtains a UATI from RAN$_A$ 52. RAN$_A$ 52 then assigns a temporary IMSI to the MS 2 in order to enable packet data to be routed by the FA in PDSN$_1$ 14. The MS 2 then registers with the HA 20 as described above in association with FIG. 2. After mobile IP registration is complete, the MS 2 uses the IP address assigned to it by the HA 20, and sends packets using a PPP state within the FA in PDSN$_1$ 14. Within the coverage area 6 of RAN$_A$ 52, the MS 2 monitors overhead messages broadcast from base stations in RAN$_A$ 52.

When the MS 2 leaves the coverage area 6 of RAN$_A$ 52 and enters the coverage area 8 of RAN$_B$ 54, the MS 2 decodes the overhead messages broadcast by the base stations in RAN$_B$ 54. As discussed above, a 1× RAN like RAN$_B$ 54 broadcasts a PZID on its overhead channels. So, the MS 2 receives a subnet mask from RAN$_A$ 52 and a PZID from RAN$_B$ 54. From the different overhead messages received from RAN$_B$ 54, the MS 2 determines that it has moved into coverage of a network having a different type of wireless interface. As explained below, the MS 2 and PDSN$_1$ 14 must take special precautions to prevent packets destined for the MS 2 from being lost due to routing ambiguity.

In response to the change of network, the MS 2 sends to RAN$_B$ 54 a "fake origination" containing the actual IMSI of the MS 2. As a result, RAN$_B$ 54 establishes a new R-P connection with PDSN$_1$ 14 based on the actual IMSI of the MS 2. If PDSN$_1$ 14 has not previously established a PPP state with the MS 2 based on the actual IMSI, then PDSN$_1$ 14 negotiates a new PPP state with the MS 2. After a new PPP session is established between the MS 2 and PDSN$_1$ 14, PDSN$_1$ 14 sends an agent advertisement message to the MS 2 identifying the address of the FA within PDSN$_1$ 14. Because the PDSN has not changed, the FA address sent in the agent advertisement message will be the same as that received from RAN$_A$ 52. As a result, the MS 2 may not re-register its IP address with the HA 20. Because the MS 2 obtained its IP address from HA 20 through RAN$_A$ 52, RAN$_A$ 52 assigned a temporary IMSI to the MS 2. The IP address being used by the MS 2 is linked to the temporary IMSI in the FA within PDSN$_1$ 14. All network packets arriving at the FA in PDSN$_1$ 14 bearing that IP address will be routed to RAN$_A$ 52 unless the MS 2 re-registers its IP address with the HA 20.

In an exemplary embodiment, the MS 2 performs mobile IP re-registration whenever it moves from the coverage area of an HDR RAN 52, 56 into the coverage area of a 1× RAN 54. For example, if the MS 2 moves from the coverage area 6 of RAN$_A$ 52 to the coverage area 8 of RAN$_B$ 54, the MS 2 re-registers its address with the HA 20 even if the FA address received in the agent advertisement message is the same as the one used immediately prior.

Unfortunately, re-registering with the HA 20 does not entirely solve the routing ambiguity. When the MS 2 first obtains its IP address from the HA 20 through RAN$_A$ 52, the foreign agent in PDSN$_1$ 14 associates an R-P session with the combination of temporary IMSI and IP address used. After the MS 2 moves into the coverage area of RAN$_B$ 54, the MS 2 re-registers with the HA 20 and is generally allocated the same IP address. Unfortunately, the re-registration uses the actual IMSI of the MS 2 instead of the temporary IMSI initially assigned by RAN$_A$ 52. Consequently, PDSN$_1$ 14 will end up having the same IP address assigned to two different R-P sessions, each corresponding to a different IMSI. When a packet arrives from the IP network 18 bearing that IP address, PDSN$_1$ 14 will be unable to unambiguously route the packet to a RAN.

In an exemplary embodiment, the PDSNs in a mixed network are modified to prevent such ambiguity. Any time the FA assigns an IP address to an IMSI, the FA purges its tables of any other entries bearing the same IP address, regardless of the value of the IMSI. Only one R-P session per IP address is allowed within an FA of a PDSN.

In addition to the case where an MS 2 moves from an HDR system to a 1× system, special precautions must be taken to avoid routing ambiguity when the MS 2 moves from a 1× system to an HDR system. The problems may be particularly acute when an MS 2 establishes a connection through an HDR RAN, such as RAN$_C$ 56, then moves to a 1× RAN such as RAN$_B$ 54, served by a different PDSN, re-registers its IP address with the HA 20 while in RAN$_B$ 54, and then returns to RAN$_C$ 56. In the currently proposed HDR standards, there is no way for an MS 2 to notify the RAN$_C$ 56 that it has just come from a system that uses a different wireless interface or that it has re-registered its IP address in the other system. This is not a problem when moving from a 1× RAN to a 1× RAN, because the PREV_PZID in the fake origination allows the PDSN to determine that the MS 2 re-registered through a different PDSN. This is also not a problem when moving from an HDR RAN to an HDR RAN, because the UATI in the UATI Request allows the destination PDSN to determine whether the MS 2 re-registered through a different PDSN.

When the MS 2 reenters the coverage area 10 of HDR RAN$_C$ 56 from 1× RAN$_B$ 54, the MS 2 sends a UATI Request containing the UATI used by the MS 2 when previously in the coverage area 10 of HDR RAN$_C$ 56. The MS 2 has no way, using the currently proposed protocols, to notify HDR RAN$_C$ 56 of its re-registration in the intervening 1× system. Consequently, RAN$_C$ 56 will resume network communications using the existing PPP state in PDSN$_2$ 16 associated with the UATI used previously by the MS 2.

In an exemplary embodiment, the MS 2 always resets its UATI upon moving from a 1× RAN to an HDR RAN. When the reset UATI is sent in the UATI Request, the HDR RAN will assign a new UATI to the MS 2 and thus force a mobile IP re-registration. The mobile IP re-registration will generally result in the MS 2 being assigned the same IP address it was using previously. Upon completion of the mobile IP re-registration, the HA 20 will properly direct network packets to the HDR RAN, and to the MS 2. In an alternate embodiment, the MS 2 accomplishes substantially the same thing by simply forcing a PPP reset whenever the MS 2 moves from a 1× RAN to an HDR RAN.

In another embodiment, the HDR standard is altered to allow the MS 2 to initiate a LocationResponse message to the HDR RAN. In the existing HDR specification, the LocationResponse message may contain the system identifier (SID), network identifier (NID), and PZID of the previous system in which the MS 2 re-registered its IP address. Armed with this information, the HDR RAN could query its PDSN to possibly shift the R-P session to the HDR RAN. Or, if the PZID belongs to a 1× RAN associated with a different PDSN, the PDSN can reset the PPP session and thus trigger an IP address re-registration.

In another embodiment, the MS 2 sends a mobile IP AgentSolicitation message to the FA in the destination PDSN. Based on the address of the FA gleaned from the response, the MS 2 can re-register its IP address with the HA 20 without expending the bandwidth necessary to establish a new PPP session.

Figure 5:
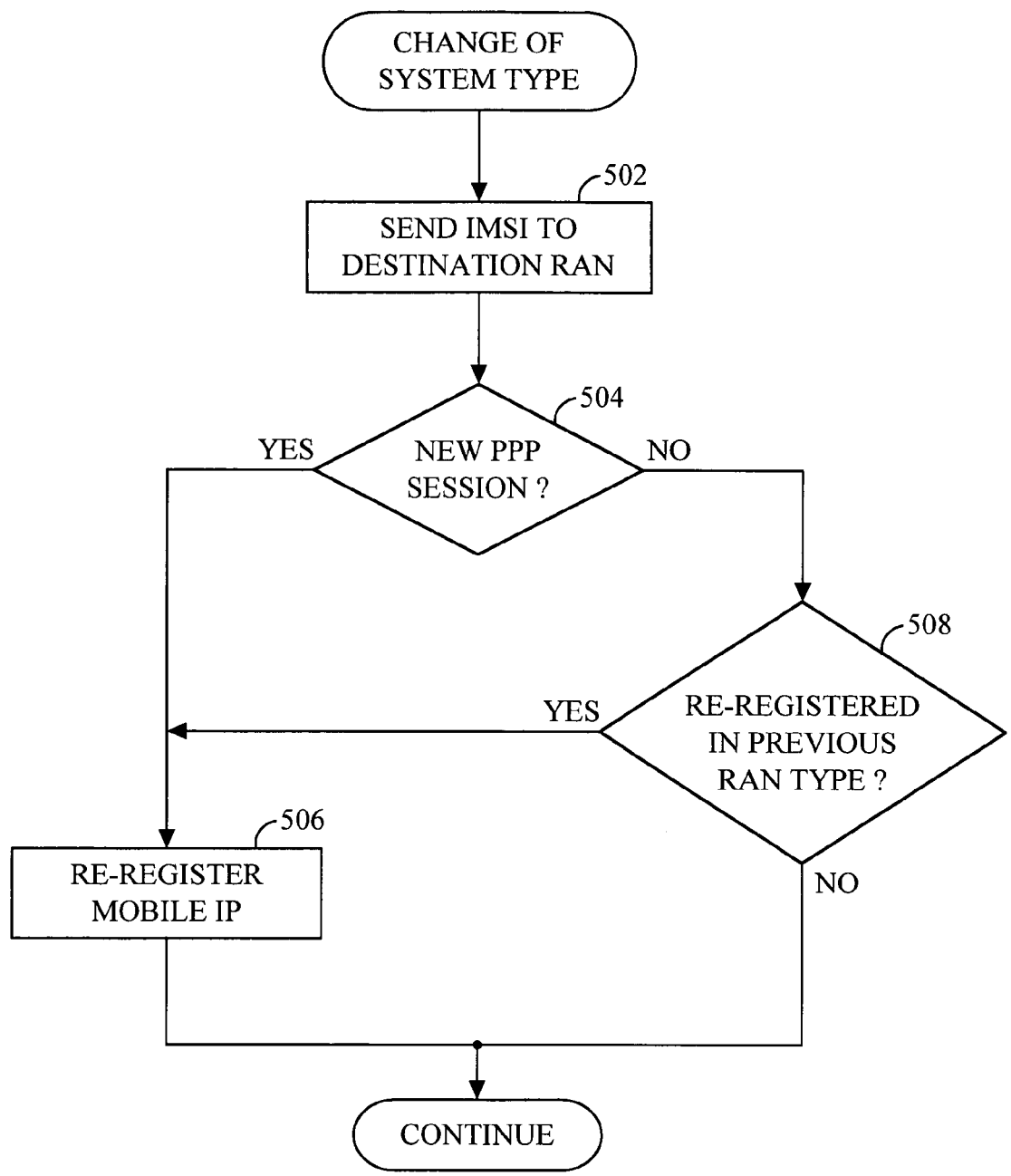
FIG. 5 is a flowchart showing an exemplary process used by an MS when handing off between a 1× RAN and an HDR RAN capable of performing International Mobile Station Identity (IMSI) authentication, in accordance with an embodiment of the present invention.

FIG. 5 is a flowchart showing an exemplary process used by the MS 2 when handing off between a 1× RAN and an HDR RAN capable of performing IMSI authentication. Upon detecting a change of RAN type, the MS 2 sends its IMSI to the destination RAN at step 502. If the destination RAN is a 1× RAN, the IMSI may be sent in the origination message for a "fake origination." If the destination RAN is an HDR RAN, the IMSI may be sent in a configuration message while the new HDR session is being negotiated.

If the PDSN connected to the destination RAN does not have an R-P session associated with the IMSI of the MS 2, the PDSN will establish a new PPP session with the MS 2. At step 504, the MS 2 determines whether a new PPP session has been established with the PDSN. The establishment of a new PPP session by the PDSN could mean that the PDSN has no existing PPP state associated with the IMSI of the MS 2. Alternatively, the establishment of a new PPP session by the PDSN could mean that the PDSN cannot transfer an existing PPP state from an R-P session of a previous RAN to the destination RAN. In either case, the PDSN will generally send an agent advertisement message to the MS 2 indicating the address of the FA within the PDSN. If the previous RAN providing service to the MS 2 was connected to the same PDSN, then it might not be necessary to re-register mobile IP with the HA 20. The HA 20 would forward packets to the correct PDSN. However, if the previous RAN providing service to the MS 2 was connected to a different PDSN, then the MS 2 should re-register mobile IP in order to notify the HA 20 of the new PDSN address. Because the MS 2 cannot determine whether the new PPP state was necessitated by a change of PDSN, the MS re-registers its mobile IP address with the HA 20 at step 506.

If, at step 504, the MS 2 determines that no new PPP session has been established with the PDSN, then the MS 2 determines, at step 508, whether a mobile IP re-registration occurred in the previous RAN type. As discussed above, protocols used with the different wireless interfaces are designed to manage movement of the MS 2 among different RANs of the same type. Thus, when the MS 2 moves among RANs of the same type, no routing ambiguity results. When moving among 1× RANs, the MS 2 sends information about the previous RAN such as the PZID to allow the destination RAN to determine whether a new PPP session should be established. When the MS 2 is moving among HDR RANs, the destination RAN determines whether a new PPP session is needed by comparing the UATI received from the MS 2 in a UATI update message.

However, when the MS 2 returns to a RAN having a different type of wireless interface, the messages it sends to the destination RAN do not identify a previous RAN of a different type. If the destination RAN is an HDR RAN, the MS 2 cannot send a previous PZID value in a UATI update message. Likewise, the MS 2 cannot send a UATI in a 1× origination. If the previous RAN and the destination RAN are connected to different PDSNs, and the MS 2 re-registered its mobile IP address with the HA 20 in the previous system, the HA 20 will still send subsequent packets addressed to the MS 2 to the previous RAN's PDSN. In order to prevent such routing ambiguity, if the MS 2 performed a mobile IP re-registration in the previous RAN type, it re-registers its mobile IP address at step 506.

Figure 6:
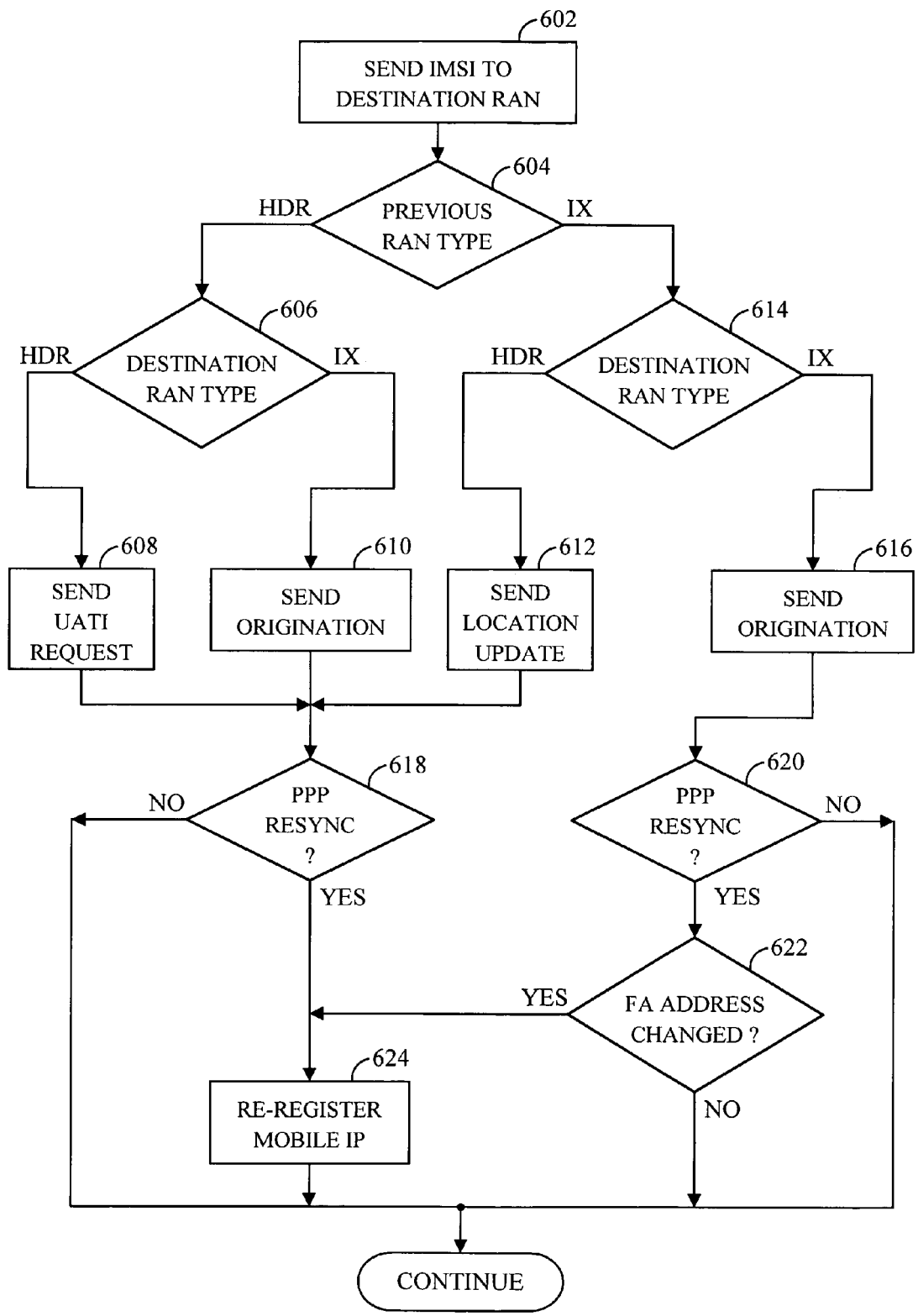
FIG. 6 is a flowchart showing an exemplary process used by an MS when handing off between a different RANs, where it is not known whether the HDR RANs are capable of performing IMSI authentication, in accordance with an embodiment of the present invention.

FIG. 6 is a flowchart showing an exemplary process used by the MS 2 when handing off between different RANs, when it is not known whether the HDR RANs are capable of performing IMSI authentication. Upon detecting a change of RAN, the MS 2 sends its IMSI to the destination RAN at step 602. The MS 2 then determines, in steps 604, 606, 608 which of four possible handoff types is required: (1) HDR-to-HDR; (2) 1×-to-1×; (3) HDR-to-1×; or (4) 1×-to-HDR. The MS 2 processes each different handoff type differently.

At step 604, the MS 2 determines the type of the previous RAN. If the previous RAN was an HDR RAN, the MS 2 then determines, at step 606, the type of the destination RAN. If the destination RAN is also HDR, then the MS 2 sends a UATI Request to the destination RAN at step 608. Then, the MS 2 determines, at step 618, whether the destination PDSN established a new PPP session. If the destination PDSN did not establish a new PPP session, the MS 2 continues normal operation and can send and receive packet data through the destination RAN. Otherwise, the MS 2 re-registers its mobile IP address with the HA 20 at step 624.

If, at step 604, the MS 2 determines that the previous RAN was a 1× RAN, the MS 2 then determines, at step 614, the type of the destination RAN. If the destination RAN is also 1×, then the MS 2 sends an origination message to the destination RAN at step 616. As discussed above, this origination message can be a "fake origination" containing a DRS field value of 0. The origination message contains the MS's 2 IMSI and any system identification values associated with the destination RAN that are different from those for the previous RAN, such as the PZID. Based on the information in the origination message, the PDSN connected to the destination RAN may establish a new PPP session. At step 620, the MS 2 determines whether the destination PDSN established a new PPP session. If the destination PDSN did not establish a new PPP session, the MS 2 continues normal operation and can send and receive packet data through the destination RAN. Otherwise, the MS 2 receives an agent advertisement at step 622 and compares the FA address to the FA address previously used to register a mobile IP address with the HA 20. If the previous FA address is different from the address of the destination FA, the MS 2 re-registers its mobile IP address at step 624. Otherwise, the MS 2 continues normal operation and can send and receive packet data through the destination RAN.

If, at step 606, the MS 2 determines that the destination RAN is a 1× RAN, then the MS 2 sends an origination message at step 610. This origination message can be a "fake origination" containing a DRS field value of 0. In an exemplary embodiment, when handing off to an HDR RAN, the MS 2 saves the system identification values of the previous 1× RAN. The origination message contains the MS's 2 IMSI and may contain previous system identification values such as PZID, SID, or NID. After sending the origination at step 610, the MS 2 continues to step 618 described above.

If, at step 614, the MS 2 determines that the destination RAN is an HDR RAN, then the MS 2 sends a Location Update message at step 612. In an exemplary embodiment, the Location Update message contains the PZID, SID, and NID of the previous 1× RAN. In an exemplary embodiment, the Location Update message contains a LocationValue field as defined in the HDR specification. The destination HDR RAN may use the information in the Location Update message to determine whether the MS 2 is handing off from a previous RAN connected to a different PDSN. If the previous RAN and the destination RAN share a PDSN, then the PDSN may be able to move the R-P state associated with the MS 2 to the destination RAN without requiring a mobile IP re-registration or establishment of a new PPP session. After sending the Location Update message, the MS 2 continues to step 618 described above.

Figure 7A:
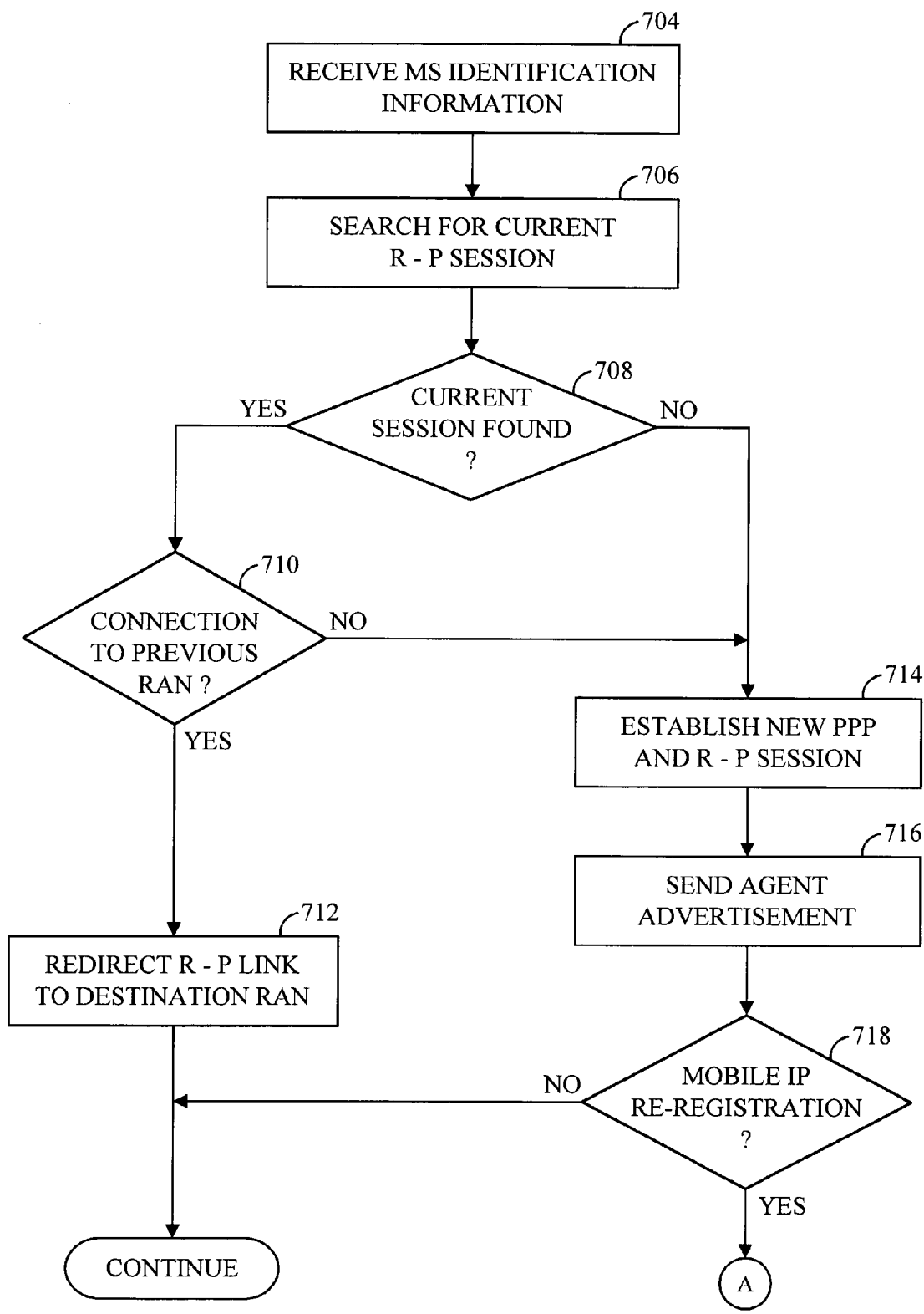
FIG. 7 is a flowchart of a handoff process for a destination network including a destination PDSN and a destination RAN, and in accordance with an embodiment of the present invention.
Figure 7B:
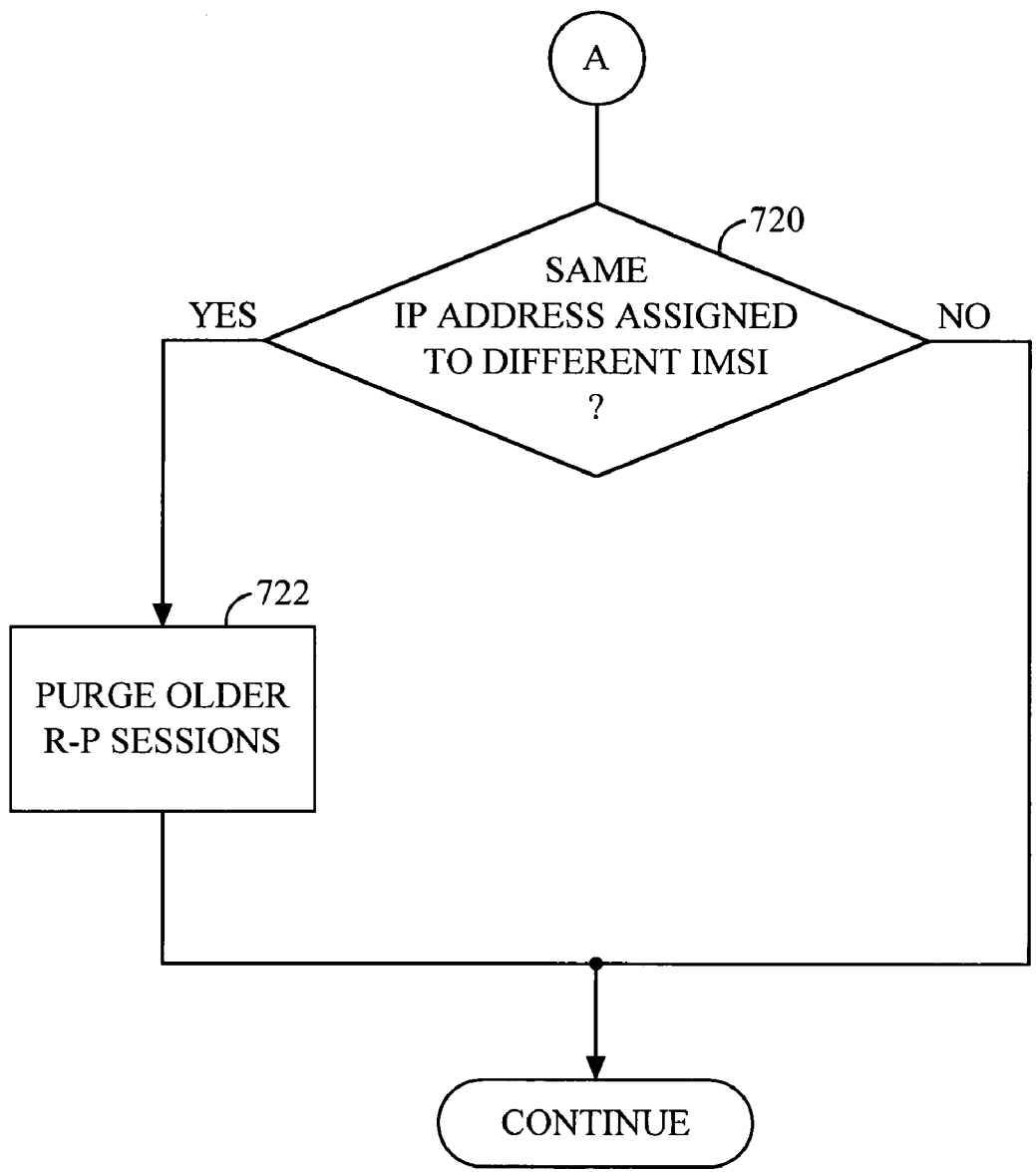

FIG. 7 (FIGS. 7a and 7b) is a flowchart of a handoff process for a destination network including the destination PDSN and the destination RAN. At step 704, the destination RAN receives identification information from the incoming MS 2. The identification information may include an IMSI, a UATI, or system identification information associated with the previous RAN such as PZID, SID, or NID. As discussed above, the types of identification information received from an incoming MS 2 may vary based on the wireless interfaces used by the previous and destination RANs.

At step 706, the destination network searches for an existing PPP session associated with the incoming MS 2. In an HDR network, this can include searching for IMSIs, UATIs, or other information distributed among multiple HDR RANs. In a 1× network, this can include searching for the IMSI of the MS 2 in a database within the destination PDSN. In either type of network, the search may include authenticating the IMSI received from the MS 2. If the destination network supports IMSI authentication, and the MS 2 cannot be successfully authenticated, the network will either deny packet services to the MS or, in the case of an HDR RAN, will assign a temporary IMSI to identify the R-P session in the DESTINATION PDSN. Ultimately, at step 708, the DESTINATION PDSN determines whether or not it has an existing R-P session associated with the incoming MS 2.

If a session can be found, then at step 710 the destination network determines whether an identified previous RAN is connected to the destination PDSN. If so, then the destination PDSN redirects its R-P session to the destination RAN at step 712, and packet data service to the MS 2 can continue without mobile IP re-registration or establishment of a new PPP session. If a session cannot be found, then at step 714 the destination PDSN establishes a new PPP session with the incoming MS 2. After the new PPP session is established, the destination PDSN sends, at step 716, an agent advertisement containing the address of the FA within the destination PDSN to the incoming MS 2. At step 718, if the agent advertisement does not cause the incoming MS 2 to re-register its IP address with the HA 20, then packet data service to the MS 2 can continue.

If, at step 718, the incoming MS 2 re-registers its IP address, then at step 720, the destination PDSN monitors the IP address assigned to the incoming MS 2 through its FA. If the assigned IP address matches the IP address associated with any other R-P sessions in the PDSN, then at step 722 the PDSN terminates the other R-P sessions. The PDSN terminates such other R-P sessions even if they have different IMSIs to prevent any routing ambiguity. After step 722, or if, at step 718, the incoming MS 2 does not re-register its IP address, then packet data service to the MS 2 can continue.

Figure 8:
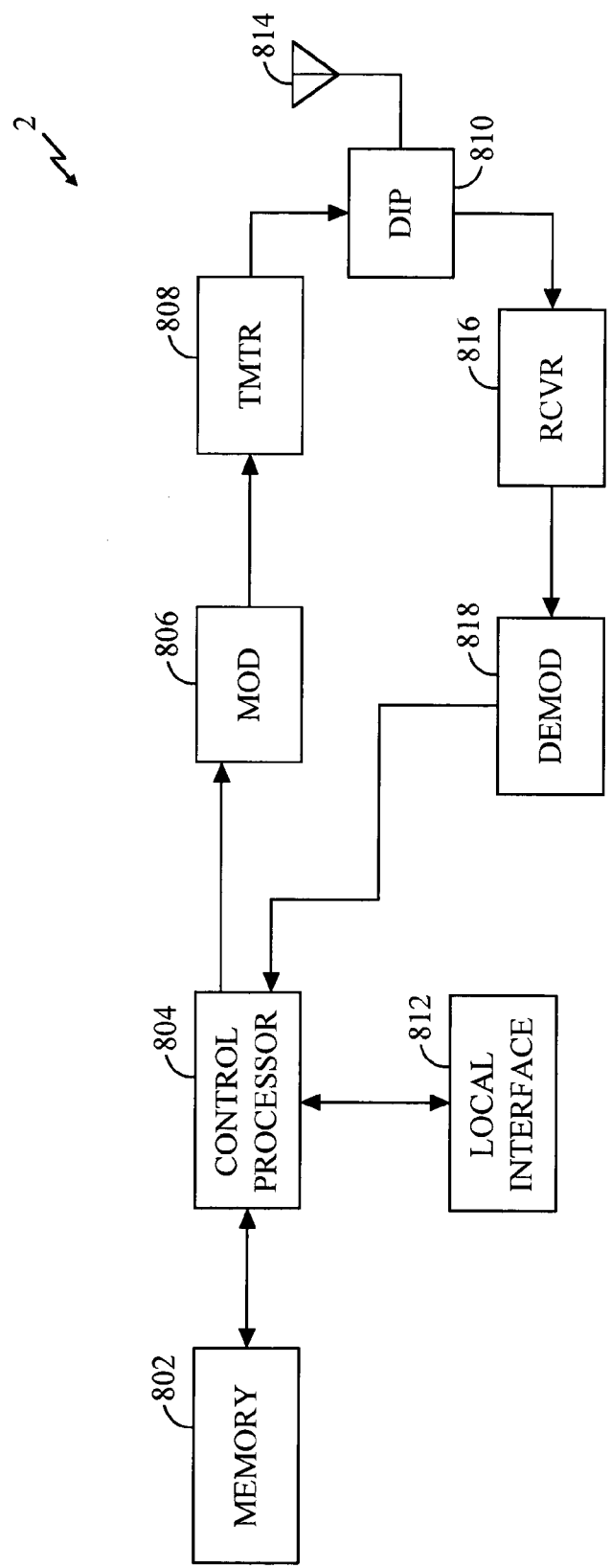
FIG. 8 is a block diagram of an exemplary MS configured in accordance with an embodiment of the present invention.

FIG. 8 shows an exemplary MS 2 apparatus. As discussed above, the MS 2 may have a data connection 12 to an external terminal or device such as a personal or laptop computer (PC) 4. In such a configuration, the MS 2 includes a local interface 812 to provide necessary conversions of data connection signals and digital data. The local interface 812 can be any of a variety of cabled interface types such an ethernet, serial, or universal serial bus (USB). Alternatively, the local interface 812 may provide a wireless connection such as an infrared or other optical connection or a radio connection such as Bluetooth or IEEE 802.11.

Instead of providing a connection to an external PC 4, the MS 2 may provide direct access to the IP network 18. For example, the MS 2 may include a web browser application using such protocols as the Wireless Application Protocol (WAP). In such an incorporated application, the local interface 812 may take the form of a user interface including keypads, LCD displays, or touch-sensitive displays such as pen input interfaces like those commonly used on handheld personal digital assistant devices (PDAs), or any other input interface appropriate for wireless packet data user applications.

In an exemplary embodiment, the local interface 812 provides application data to a control processor 804. The control processor 804 may be a general-purpose microprocessor, digital signal processor (DSP), programmable logic device, application specific integrated circuit (ASIC), or any other device capable of performing the functions described herein. The handset user input interface and handset display may include a keypad, a liquid crystal display (LCD) pen input interface such as those commonly used on handheld personal digital assistant devices (PDAs), or any other input interface appropriate for wireless packet data user applications.

In addition, the control processor 804 is configured to perform the MS 2 processing described in conjunction with FIGS. 1–7, such as requesting IP resources, managing PPP sessions, and other network protocol processes associated with the various wireless interfaces. The control processor 804 may be a single processor, or may include multiple separate processors such as a microcontroller for managing user interface functions through the local interface 812 and a DSP for managing wireless interface protocols.

The MS 2 includes a memory 802 for storing the various types of data and information needed during operation of the control processor 804. The memory 802 may be a single device or may include multiple devices such as non-volatile memory including flash memory, static or dynamic random access memory (RAM), or erasable or non-erasable read-only memory (ROM). The entire memory 802 or portions thereof may be incorporated into a single device with the entire control processor 804 or portions thereof. The memory 802 may contain such information as the executable code for the control processor 804, the IMSI, the shared secret information used to register a mobile IP address, the address of the HA 20, and the mobile IP address. Additionally, the memory 802 is configured to store temporary copies of packet data transmitted to and received from the wireless network, and all the state variables necessary for providing packet data services.

In an exemplary embodiment, data to be sent to the wireless network is encoded, modulated, and interleaved in a modulator (MOD) 806, and amplified and upconverted in a transmitter (TMTR) 808 before being transmitted through a diplexer (DIP) 810 and an antenna 814. Data received from the wireless network through the antenna 814 is gain-controlled and downconverted in a receiver (RCVR) 816, deinterleaved, demodulated, and decoded in a demodulator (DEMOD) 818 before being processed by the control processor 804. The modulator (MOD) 806, transmitter (TMTR) 808, receiver (RCVR) 816, and demodulator (DEMOD) 818 are capable of operating using multiple types of wireless interfaces, for example 1× and HDR. If necessary, the MS 2 includes multiple modulators, transmitters, receivers, or demodulators as necessary for compatibility with the multiple types of wireless interfaces, including 1×, HDR, W-CDMA, and EDGE.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of performing a handoff of a mobile station between a first radio access network of a first type and a second radio access network of a second type, comprising:
    determining, at the mobile station, whether changing from communicating over the first radio access network to communicating over the second radio access network will cause routing ambiguity for data sent to and from the mobile station; and
    triggering, at the mobile station, a re-registration of a network address of the mobile station if changing from communicating over the first radio access network to communicating over the second radio access network will cause routing ambiguity for data sent to and from the mobile station.

2. The method of claim 1 wherein said first radio access network transmits a subnet mask, wherein said determining comprises decoding a packet zone ID received from said second radio access network.

3. The method of claim 1 wherein said first radio access network transmits a packet zone ID, wherein said determining comprises decoding a subnet mask received from said second radio access network.

4. The method of claim 1 wherein said determining comprises sending a fake origination to said second radio access network.

5. A mobile station, comprising:
    a control processor; and
    a memory coupled to the control processor and containing instructions executable by the processor to determine whether handing off from a radio access network of a first type to a radio access network of a second type will cause routing ambiguity for data sent to and from the mobile station, and triggering a re-registration of a network address of the mobile station based on the determination.

6. A mobile station, comprising:
    means for determining whether handing off communications from a radio access network of a first type to a radio access network of a second type will cause routing ambiguity for data sent to and from the mobile station; and
    means for triggering a re-registration of a network address of the mobile station based on the determination.

7. A method of performing a handoff of a mobile station from a first radio access network to a second radio access network, the method comprising:
    identifying the first radio access network as a first type of radio access network and the second radio access network as a second type of radio access network; and
    determining, at the mobile station, whether changing from communicating over the first radio access network to communication over the second radio access network will cause routing ambiguity for data sent to and from the mobile station; and
    initiating a mobile IP re-registration based on said identifying.

8. The method of claim 7 wherein the first type is 1× and the second type is high data rate (HDR).

9. The method of claim 7 wherein the first type is high data rate (HDR) and the second type is 1×.

10. The method of claim 7 wherein the first type is 1× and the second type is high data rate (HDR), the method further comprising resetting a Unicast Access Terminal Identifiers (UATI) associated with the mobile station based on said identifying.

11. The method of claim 7 wherein the first type is 1× and the second type is high data rate (HDR), the method further comprising sending a Location Response message from the mobile station to the second radio access network based on said identifying.

* * * * *